United States Patent
Mittal

(10) Patent No.: US 9,720,830 B2
(45) Date of Patent: Aug. 1, 2017

(54) SYSTEMS AND METHODS FACILITATING REDUCED LATENCY VIA STASHING IN SYSTEM ON CHIPS

(71) Applicant: APPLIED MICRO CIRCUITS CORPORATION, Sunnyvale, CA (US)

(72) Inventor: Millind Mittal, Palo Alto, CA (US)

(73) Assignee: MACOM CONNECTIVITY SOLUTIONS, LLC, Lowell, MA (US)

( * ) Notice: Subject to any disclaimer, the term of this patent is extended or adjusted under 35 U.S.C. 154(b) by 81 days.

(21) Appl. No.: 14/796,167

(22) Filed: Jul. 10, 2015

(65) Prior Publication Data

US 2017/0010966 A1    Jan. 12, 2017

(51) Int. Cl.
| | | |
|---|---|---|
| *G06F 12/00* | (2006.01) | |
| *G06F 12/0811* | (2016.01) | |
| *G06F 12/084* | (2016.01) | |
| *G06F 12/0842* | (2016.01) | |
| *G06F 12/0875* | (2016.01) | |

(52) U.S. Cl.
CPC ........ *G06F 12/0811* (2013.01); *G06F 12/084* (2013.01); *G06F 12/0842* (2013.01); *G06F 12/0875* (2013.01); *G06F 2212/1024* (2013.01); *G06F 2212/251* (2013.01); *G06F 2212/452* (2013.01); *G06F 2212/602* (2013.01)

(58) Field of Classification Search
CPC ............... G06F 12/0811; G06F 12/084; G06F 12/0842; G06F 12/0875; G06F 2212/1024; G06F 2212/251; G06F 2212/452; G06F 2212/602
See application file for complete search history.

(56) References Cited

U.S. PATENT DOCUMENTS 6,446,167 B1    9/2002  Mayfield et al.
6,924,810 B1    8/2005  Tischler
(Continued)

FOREIGN PATENT DOCUMENTS

EP    1 217 526    6/2002

OTHER PUBLICATIONS

International Search Report & Written Opinion for PCT Application Serial No. PCT/US2015/042791, mailed Apr. 8, 2016, 11 pages.

*Primary Examiner* — David X Yi
*Assistant Examiner* — Francisco Grullon
(74) *Attorney, Agent, or Firm* — Amin, Turocy & Watson LLP

(57) ABSTRACT

Systems and methods that facilitate reduced latency via stashing in multi-level cache memory architectures of systems on chips (SoCs) are provided. One method involves stashing, by a device includes a plurality of multi-processor central processing unit cores, first data into a first cache memory of a plurality of cache memories, the plurality of cache memories being associated with a multi-level cache memory architecture. The method also includes generating control information including: a first instruction to cause monitoring contents of a second cache memory of the plurality of cache memories to determine whether a defined condition is satisfied for the second cache memory; and a second instruction to cause prefetching the first data into the second cache memory of the plurality of cache memories based on a determination that the defined condition is satisfied.

19 Claims, 7 Drawing Sheets

(56) References Cited

U.S. PATENT DOCUMENTS

| | | | |
|---|---|---|---|
| 7,773,597 B2 | 8/2010 | Chen | |
| 7,774,522 B2* | 8/2010 | Bouvier | G06F 12/0888 |
| | | | 710/55 |
| 8,370,294 B2 | 2/2013 | Lyakhovitskiy | |
| 8,429,315 B1* | 4/2013 | Chudgar | G06F 3/00 |
| | | | 709/250 |
| 8,671,232 B1 | 3/2014 | Garg et al. | |
| 8,924,784 B2 | 12/2014 | Xu et al. | |
| 9,336,162 B1* | 5/2016 | Sathe | G06F 12/0802 |
| 2010/0125677 A1* | 5/2010 | Bouvier | G06F 12/126 |
| | | | 710/5 |
| 2012/0226865 A1* | 9/2012 | Choi | G06F 13/1642 |
| | | | 711/121 |
| 2013/0268822 A1* | 10/2013 | Manoochehri | H03M 13/29 |
| | | | 714/758 |
| 2016/0154737 A1* | 6/2016 | Garg | G06F 12/0862 |
| | | | 711/137 |

* cited by examiner

SYSTEMS AND METHODS FACILITATING REDUCED LATENCY VIA STASHING IN SYSTEM ON CHIPS

TECHNICAL FIELD

The subject disclosure relates generally to systems-on-chips (SoCs), and more particularly to systems and methods facilitating reduced latency via stashing in SoCs.

BACKGROUND

Advancements in computing technology and a need for greater data management have led to an increase in fabrication of SoC integrated circuits. SoCs typically integrate several components of a computer on a single chip substrate. Specifically, SoCs integrate analog, mixed-signal, digital and/or radio frequency circuitry on a single chip substrate, and can increase processing power by using multiple processors and an on-chip interconnection.

Requests associated with data processing often require instructions to be obtained from memory for use by a processor (or, in the case of multi-processors, for use by a central processing unit (CPU) core of a multi-processor). However, obtaining instructions or other data from main memory can introduce excess latency.

In some cases, SoC design includes multi-level cache memory architectures composed of one or more per processor (or CPU core) cache memories and one or more shared processor (or shared CPU core) cache memories. Shared CPU core cache memories are shared and accessible by two or more processors, or, in multi-processor embodiments, shared and accessible by two or more CPU cores. Unfortunately, notwithstanding the advantages of multi-level cache memory architectures, the result of these types of architectures is often high-complexity. Accordingly, systems and methods of low complexity that facilitate reduced latency employing multi-level cache memory architectures are desired.

The above information is merely intended to provide a contextual overview of aspects of SoCs having multi-level cache memories and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an embodiment, a method includes: stashing, by a device comprising a plurality of multi-processor central processing unit cores, first data into a first cache memory of a plurality of cache memories, the plurality of cache memories being associated with a multi-level cache memory architecture. The method also includes generating control information including a first instruction to cause monitoring contents of a second cache memory of the plurality of cache memories to determine whether a defined condition is satisfied for the second cache memory. The method also includes prefetching the first data from the first cache memory to the second cache memory based on execution of the first instruction.

Another embodiment is a method including: stashing, by a device comprising a plurality of multi-processor central processing unit cores, first data into a first cache memory of a plurality of cache memories, the plurality of cache memories being associated with a multi-level cache memory architecture; and determining that the first data will be executed on a selected multi-processor central processing unit core of the plurality of multi-processor central processing unit cores, the selected multi-processor central processing unit core being associated with a second cache memory, the determining being based on a detected request for a first address associated with the first data from the selected multi-processor central processing unit core. The method also includes generating control information comprising a first instruction to cause prefetching the first data into the second cache memory of the plurality of cache memories.

Yet another embodiment is a system on chip including: a plurality of cache memories communicatively coupled to a plurality of multi-processor central processing unit cores, the plurality of cache memories being associated with a multi-level cache memory architecture; and a cache memory control circuit configured to generate a signal to cause first data and a first address for the first data to be stashed into a first cache memory of a plurality of cache memories. The system on chip also includes a device configured to perform operations including: fetching data for the first address associated with the first data to be executed on a defined multi-processor central processing unit core of the plurality of multi-processor central processing unit cores, the fetching being in response to a determination that the defined multi-processor central processing unit core has requested the first data of the first address; and prefetching a set of addresses relative to the first address, the prefetching being performed in response to initiation of the fetching.

One or more embodiments can advantageously provide a low-complexity solution employing efficient stashing for SoCs with multi-level cache memory architectures. One or more of the embodiments described herein can be employed in or to provide any number of different systems including, but not limited to, data center computers, cloud computing systems, embedded communication processors, enterprise servers (e.g., multiple processor server systems) or the like.

The following description and the corresponding drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
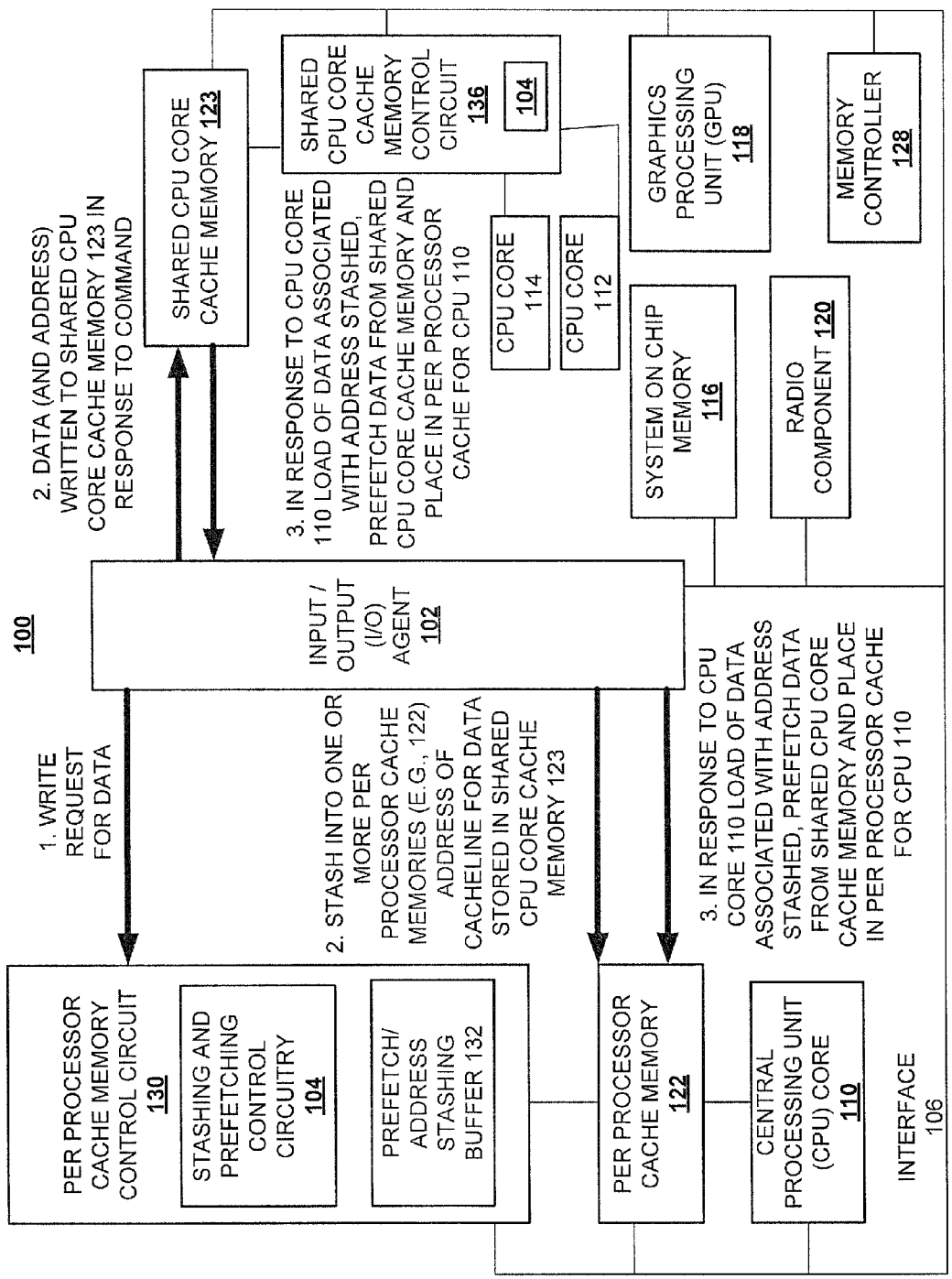
FIG. 1 is a block diagram illustrating an example, non-limiting embodiment of an SoC for which stashing in multi-level cache memory architectures can be facilitated in accordance with one or more aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

FIG. 1 is a block diagram illustrating an example, non-limiting embodiment of an SoC for which stashing in multi-level cache memory architectures can be facilitated in accordance with one or more aspects described herein. FIG. 1 is a simplified subset of select components of a SoC shown merely for providing context for the embodiments described herein. In various embodiments, alternative or additional components can be included in SoC 100. As used herein, SoC 100 can be a server and/or general processor and/or can include server and/or general processor functionality.

As shown, SoC 100 can have SoC components including, but not limited to, one or more processors (e.g., central processing unit (CPU) cores 110, 112, 114), SoC memory 116, graphics processing unit (GPU) 118, radio component 120, one or more CPU core cache memories (e.g., per processor cache memory 122, shared CPU core cache memory 123), one or more cache memory control circuits (e.g., per processor cache memory control circuit 130 configured to control per processor cache memory 122, and shared CPU core cache memory control circuit configured to control shared CPU core cache memory 123), memory controller 128 and/or input/output (I/O) agent 102. As shown, the controller (e.g., per processor cache memory control circuit 130) for the per processor CPU cache memory (e.g., per processor cache memory 122) can be distinct from the controller (e.g., shared CPU core cache memory control circuit 136) for the shared CPU core caches (e.g., shared CPU core cache memory 123).

As described herein, shared CPU core cache memory is or includes a cache memory that is shared by multiple processors (e.g., CPU cores 112, 114). Per processor cache memory is or includes a cache memory that is used by only one processor (e.g., per processor cache memory 122).

In some embodiments, one or more (or, in some embodiments, each of) per processor cache memory control circuits and/or shared CPU core cache memory control circuits can include or be electrically and/or communicatively coupled to a stashing and prefetching control circuit (e.g., stashing and prefetching control circuitry 104 at per processor cache memory control circuit 130 and stashing and prefetching control circuitry 104 at shared CPU core cache memory control circuit 136).

As shown, one or more per processor cache memory control circuits on SoC 100 (e.g., per processor cache memory control circuit 130) can include a prefetch/address stashing buffer (e.g., prefetch/address stashing buffer 132) that can be controlled by stashing and prefetching control circuitry 104 in some embodiments. In some embodiments, prefetch/address stashing buffer 132 can be or include a prefetch buffer with stashing logic.

In some embodiments, the prefetching is performed as a result of an instruction that accesses the address in the prefetch/address stashing buffer 132 that results in prefetch logic in the prefetch/address stashing buffer being triggered to fetch the data from the shared CPU core cache memory 123.

While one per processor cache memory and one corresponding per processor cache memory control circuit 130 are shown in FIG. 1, in other embodiments, other sets of per processor cache memory control circuit, per processor cache memory and CPU core sets can be included on SoC to facilitate stashing and/or reduced latency via additional per processor functionality. There is no particular limit to the number of processors/CPU cores, cache memories and/or configurations of SoC components.

In the embodiment shown, one or more of SoC 100 components can be electrically and/or communicatively coupled to one another (e.g., via interface 106) to perform one or more functions of SoC 100 (e.g., to facilitate stashing and/or prefetching on SoC 100). In some embodiments, while various components are electrically and/or communicatively coupled to one another, there is no communication link/path between the per processor cache memories of Soc 100 and the shared CPU core cache memories of SoC 100. However, one or more of the embodiments described herein can advantageously reduce latency in the SoC 100 notwithstanding there may be no direct communication link/path between the one or more per processor cache memories and the one or more shared CPU core cache memories.

In various embodiments, CPU cores 110, 112, 114 can be processors designed by ARM Holdings or processors having x86 architecture. In one embodiment, for example, one or more of CPU cores 110, 112, 114 can be 64-bit server on chip processor designed by ARM Holdings configured to provide server functionality via SoC 100. For example, in some embodiments, SoC 100 can serve data to one or more clients. In other examples, SoC 100 can be or be included in data center computers, cloud computing systems, embedded communication processors, enterprise servers (e.g., multiple processor server systems) or the like.

SoC memory 116 can be any number of different types of memory including, but not limited to, read only memory (ROM), random access memory (RAM), flash memory and/or electrically erasable programmable read only memory (EEPROM). In some embodiments, SoC memory 116 can be a computer-readable storage medium storing instructions, computer code and/or functions executable by CPU cores 110, 112, 114. For example, SoC memory 116 can store instructions, computer code and/or functions executable by CPU cores 110, 112, 114 described herein to facilitate any number of different data processing functions (e.g., data center operations, cloud computing, server operations or the like).

Memory controller 128 includes circuitry that manages and/or controls the flow of data to and/or from SoC memory 116. For example, memory controller 128 includes logic for reading from and/or writing to SoC memory 116.

Radio component 120 can include circuitry configured to transmit and/or receive radio frequency (RF) signals to and/or from SoC 100. In various embodiments, radio component 120 can operate according to any number of different telecommunication protocols for communication of voice, video and/or data traffic. For example, radio component 120 can operate according to Wireless Fidelity (Wi-Fi), 4G Long-Term Evolution (LTE) and/or BLUETOOTH® protocols. GPU 118 can include circuitry to process graphics information and/or create visual images for output to a display component of a device associated with SoC 100.

In a multi-processor with multiple cores, a CPU core can be associated with a specific CPU core cache memory that is accessed by and served by the CPU core. For example, CPU core 110 can be associated with per processor cache memory 122 that is accessed by and served by CPU core 110.

In some embodiments having multi-level cache architectures, one or more CPU core cache memories are shared cache memories accessible by two or more of the CPU cores over a public bus interface (e.g., interface 106) to enable data to be shared amongst more than one CPU core. In the embodiments described herein, it is assumed that stashing support is provided for per processor cache memories (e.g., per processor cache memory 122) and/or for shared CPU core cache memories (e.g., shared CPU core cache memory 123).

In some instances, embodiments described herein can include multiple levels of cache memory. For example, three different types of cache memories, L1, L2 and L3, of different levels, can be employed in different embodiments. A per processor cache memory as described herein can be an L1 cache memory in some embodiments. Ideally, information is stored in the L1 cache memory. However, the L1 per processor cache memory is typically very small due to complexity, and therefore a more efficient location for storage of data is an L2 shared CPU core cache memory (e.g., shared CPU core cache memory 123).

Typically, if there are two levels of cache memory, there is an L1 per processor cache memory and an L2 shared CPU core cache memory. If the SoC includes three levels of cache memory (e.g., L1, L2 and L3 cache memories), L1 and L2 can be per processor cache memories and the L3 cache memory can be a shared CPU core cache memory. In some embodiments, shared CPU core cache memories can be L2 and/or L3 cache memories while L1 cache memories can be per processor cache memories.

Per processor cache memories and shared CPU core cache memories are each divided into a number of cache memory lines (or cache lines), with one or more, or each, cache memory line having an address and storing particular data of a determined size (e.g., 16 to 128 bytes of data). When a CPU core (e.g., CPU core 110) requests a particular address, if the address is not already stored in the cache memory to which the CPU core has access (e.g., per processor cache memory 122), the cache memory control circuit (e.g., per processor cache memory control circuit 130) will typically perform operations to load the data at the address and store the contents of this address at the cache memory used by the CPU core. In embodiments described herein, the SoC 100 can perform stashing and/or prefetching operations to facilitate access to the data by the CPU core. If/when the CPU core (e.g., CPU core 110) requests the data at the address again, the contents at this address associated with the cache line will be in the cache memory used by the particular CPU core (e.g., per processor cache memory 122) already and the data can be retrieved from the cache memory (per processor cache memory 122) with reduced latency.

As noted above, stashing and prefetching control circuitry 104 can be configured to perform various different embodiments of stashing and/or prefetching. For example, stashing and prefetching control circuitry 104 can generate signals for control of combination stashing data into one or more of CPU cache memories (e.g., per processor cache memory 122 and/or shared CPU core cache memory 123) and/or prefetching data into CPU cache memories for reduced latency. In some embodiments, as described later herein, the stashing and/or prefetching do not require apriori knowledge of the particular CPU core on which software will be executed on the SoC.

I/O Agent 102 can include circuitry facilitating communication between one or more components on SoC 100. I/O Agent 102 can also include circuitry facilitating communication between SoC 100 and one or more peripheral components (not shown) communicatively coupled to SoC 100.

A stash request is consumed in a shared CPU core cache memory (e.g., shared CPU core cache memory 123). As such, data associated with the stash request is written in the shared CPU core cache memory 123. The address at which the data is written in the shared CPU core cache memory 123 is also written in the shared CPU core cache memory 123. In accordance with the embodiments described herein, the address at which the data is written into the shared CPU core cache memory 123 is also written into one or more of the per processor cache memories (e.g., per processor cache memory 122). I/O agent 102 can write the data into a shared CPU core cache memory (e.g., shared CPU core cache memory 123). The I/O agent 102 can also write into the shared CPU core cache memory 123, the cache line address at which the data is stored in the shared CPU core cache memory 123.

The address of the cache line at which the data is stored in shared CPU core cache memory 123 can also be stashed into a prefetch/address stashing buffer associated with the per processor cache memory control circuit 130 (e.g., prefetch/address stashing buffer 132) and/or at the per processor cache memory associated with the per processor cache memory control circuit 130 (e.g., per processor cache memory 122). The address can be stashed at the prefetch/address stashing buffer concurrent with, or in response to, or based on, stashing the data and/or address into shared CPU core cache memory 123.

In conventional systems, if the SoC 100 were to stash into per processor caches, at the time of stashing, the data would be written into all per processor caches because there is no knowledge regarding into which per processor cache to write. As such, concurrent with, or in response to, the step of writing into shared CPU core cache memory 123, data would typically be written into each per processor cache memory that may be provided on SoC 100.

In the embodiments described herein, the data stashed into shared CPU core cache memory 123 need not be written into each per processor cache memory 122. Instead, the address for the cache line into which the data is written to the shared CPU core cache memory 123 can be written into the corresponding prefetch/address stashing buffer (e.g., prefetch/address stashing buffer 132) for the per processor cache memory control circuit 130 and/or at the per processor cache memory associated with the per processor cache memory control circuit 130 (e.g., per processor cache memory 122). In some embodiments, the data and the address are stashed into a shared CPU core cache memory (e.g., shared CPU core cache memory 123) and a request is sent to the per processor cache memory control circuit 130 to write the address of the data into prefetch/address stashing buffer 132 and/or at the per processor cache memory associated with the per processor cache memory control circuit 130 (e.g., per processor cache memory 122).

In some embodiments, when/if CPU core 110 performs a load operation, an CPU core 110 hits/needs the address buffered at the prefetch/address stashing buffer 132, the prefetch access of the data associated with the address can be triggered by the prefetch/address stashing buffer or from the stashing and prefetching control circuitry 104 to prefetch the data from the shared CPU core cache memory 123 into the local cache memory for CPU core 110 (e.g., into per processor cache memory 122) to enable the load to be performed.

The embodiment described can be advantageous because there can be many L1 on SoC 100. One or more of the embodiments can initially store the data in the L2 cache (e.g., shared CPU core cache memory 123). After storing the data into the L2 cache, the address of the cache line where the data is located can be stashing into a prefetch/address stashing buffer associated with the L1 cache (e.g., prefetch/address stashing buffer 132). This simplifies the complexity of the process associated with writing data from the L2 shared cache CPU core cache memory (e.g., shared CPU core cache memory) into the L1 per processor cache memory (e.g., per processor cache memory 122) because there is no path between the L2 shared CPU core cache memory 123 and the L1 per processor cache memory 122 in some cases.

In some embodiments, in response to, concurrent with, or based on stashing the data and address into shared CPU core cache memory 123, I/O agent 102 can stash the address for the data into two or more (or, in some embodiments, all) prefetch/address stashing buffers for the per processor cache memories of the SoC 100. For example, the address can be broadcast to two or more (or, in some embodiments, all) prefetch/address stashing buffers for the per processor cache memories of the SoC 100. Then, if/when a particular per processor core (e.g., CPU core 110) hits/requests the address for the data, the particular prefetch/address stashing buffer for that particular CPU core (e.g., prefetch/address stashing buffer 132) can prefetch the data into the per processor cache memory (e.g., per processor cache memory 122) for the CPU core requesting the data.

In some embodiments, if the CPU core is streaming addresses, prefetch/address stashing buffer 132 can prefetch a set of data including, the data requested and other data having a relationship with the data requested. For example, if the data requested is first data and the other data is second data, the total data prefetched can be the first data and the second data. The second data can be data located at a set of addresses that are sequential to the address for the first data.

In some embodiments in which there are multiple streams of data to be prefetched, knowledge of which of the L1 per processor cache memories into which to stash data can be determined. The approach can then be performed of prefetching subsequent addresses for the different per processor cache memories.

In various embodiments, described herein, stashing and prefetching can be performed concurrently or at distinct time periods. As a result, data necessary for a next set of steps can be prefetched and stored in a particular per processor cache memory prior to being needed by the CPU core associated with the per processor cache memory. For example, the prefetching can be performed if a particular condition is met. For example, an L1 per processor cache memory can be monitored to determine whether the data hit/needed by a corresponding CPU core is already stored in the L1 per processor cache memory cache memory. If not, a command can be issued to cause the data to be prefetched into the L1 per processor cache memory.

Figure 2:
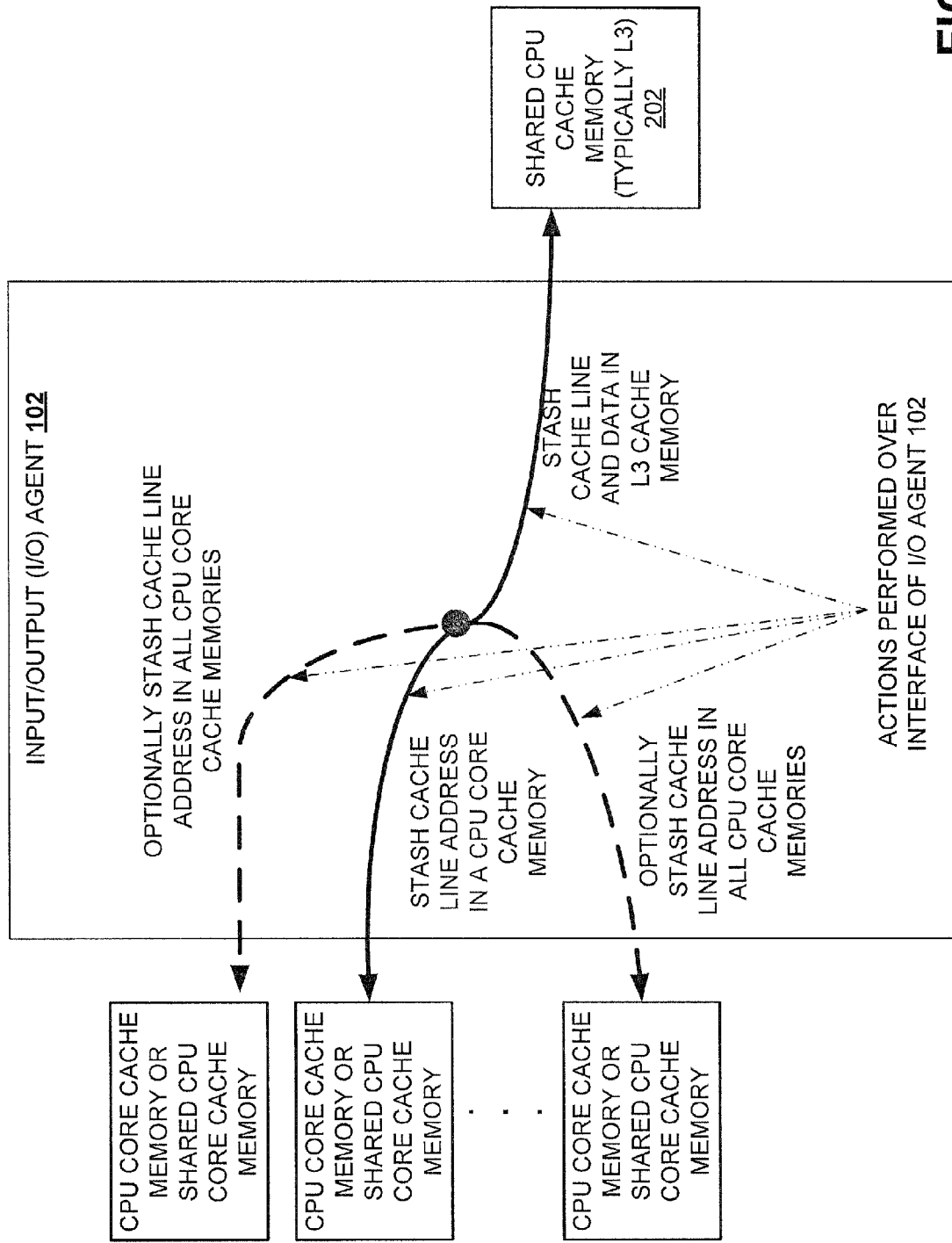
FIG. 2 is a block diagram illustrating example, non-limiting embodiments of stashing in accordance with one or more aspects described herein.

FIG. 2 is a block diagram illustrating an example, non-limiting embodiment of stashing in accordance with one or more aspects described herein. In this embodiment, the L1 and L2 cache memories are per processor cache memories while the L3 cache memory is a shared CPU cache memory. Repetitive description of like elements employed in respective embodiments of systems and/or apparatus described herein are omitted for sake of brevity. Similar to that described for FIG. 1, the address for the cache line (and the data for which the I/O agent 102 issues a write request) can be stashed in the shared CPU cache memory 202. Optionally, based on, concurrent with, or in response to stashing into the shared CPU cache memory 202, the I/O agent 102 can also stash the cache line address into one or more of the CPU core cache memory or shared CPU core cache memories shown. In some embodiments, for example, one of CPU core cache memory or shared CPU core cache memories shown can be per processor cache memory 122.

Methods of stashing in multi-level cache memory architectures in SoCs in accordance with aspects described herein will be described in greater detail with reference to FIGS. 3, 4, 5 and 6.

Figure 3:
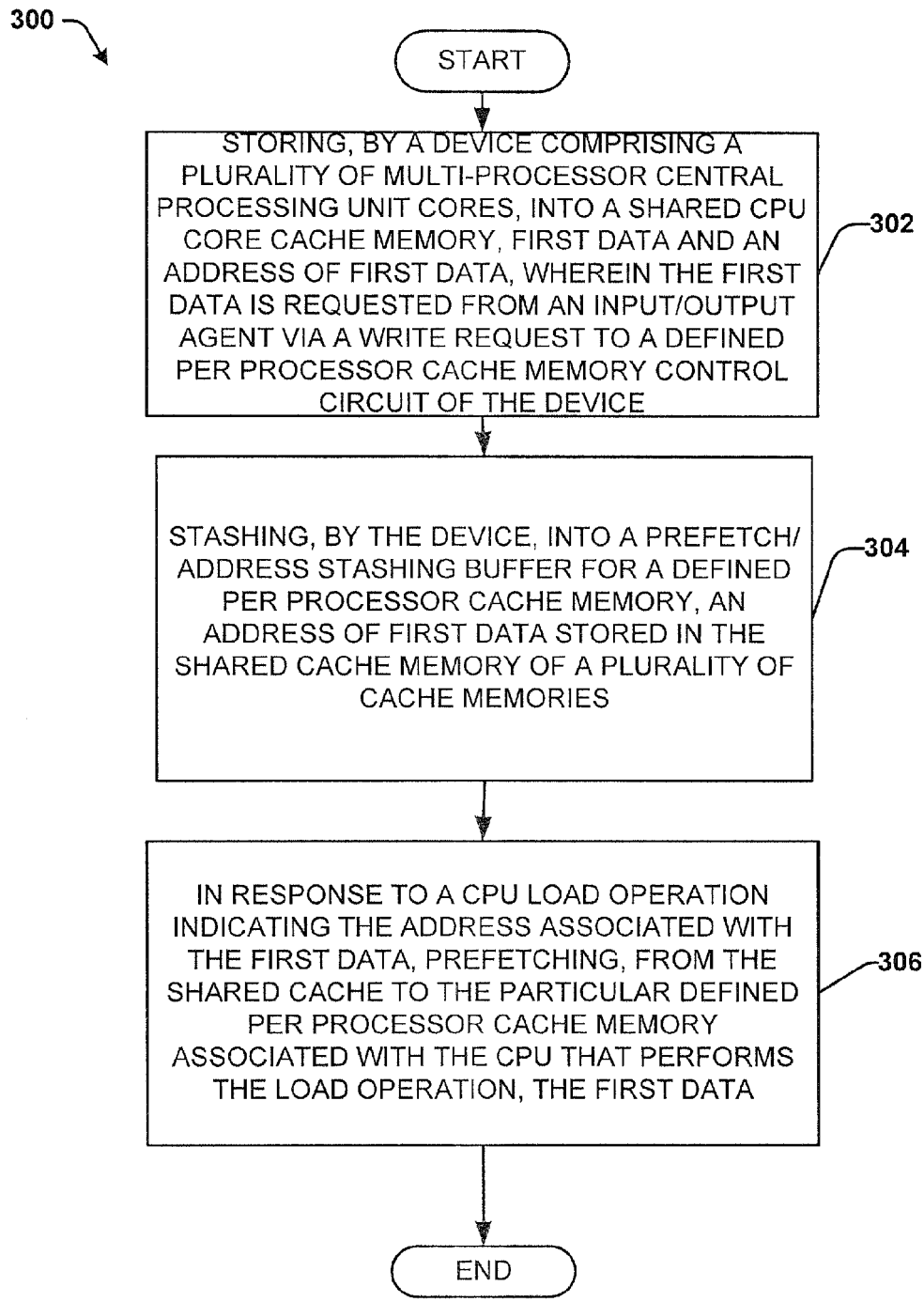
FIGS. 3-6 illustrate flow diagrams of example, non-limiting embodiments of methods facilitating stashing in multi-level cache memory architectures in SoCs in accordance with an aspect described herein.

Turning first to FIG. 3, at 302, method 300 can include storing, by a device including a plurality of multi-processor central processing unit cores, into a shared CPU core cache memory, first data and an address of first data, wherein the first data is requested from an input/output agent via a write request to a defined per processor cache memory control circuit of the device. At 304, method 300 can include stashing, by the device, into a prefetch/address stashing buffer for a defined per processor cache memory, an address of first data stored in the shared cache memory of a plurality of cache memories.

At 306, method 300 can include in response to a CPU load operation indicating the address associated with the first data, prefetching, from the shared cache to the particular defined per processor cache memory associated with the CPU that performs the load operation, the first data.

Figure 4:
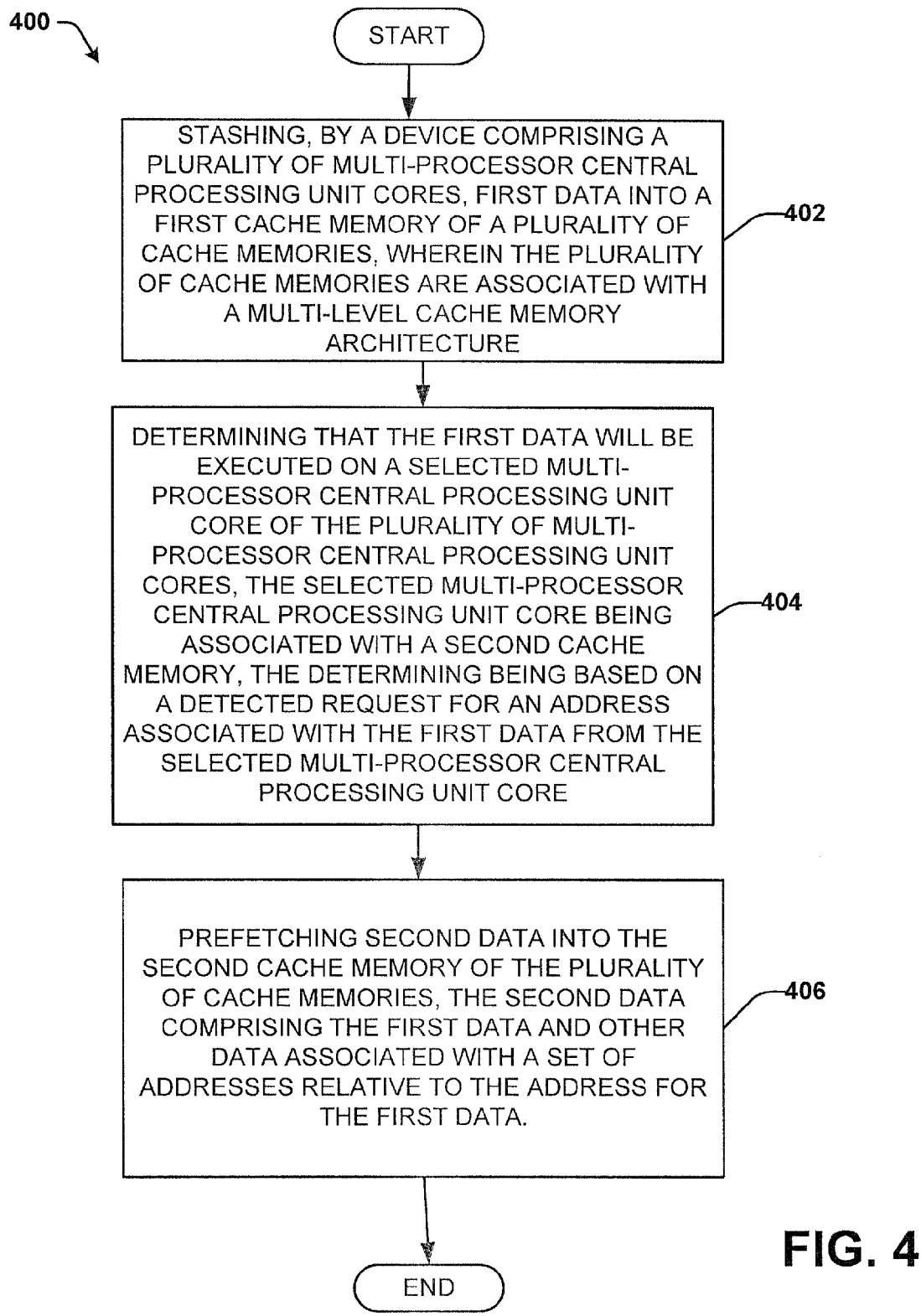

FIG. 4 illustrates a flow diagram of an example, non-limiting embodiment of a method facilitating stashing in multi-level cache memory architectures in accordance with an aspect described herein. At 402, method 400 can include stashing, by a device including a plurality of multi-processor central processing unit cores, first data into a first cache memory of a plurality of cache memories, wherein the plurality of cache memories are associated with a multi-level cache memory architecture.

At 404, method 400 can include determining that the first data will be executed on a selected multi-processor central processing unit core of the plurality of multi-processor central processing unit cores, the selected multi-processor central processing unit core being associated with a second cache memory, the determining being based on a detected request for an address associated with the first data from the selected multi-processor central processing unit core.

At 406, method 400 can include prefetching second data into the second cache memory of the plurality of cache memories, the second data including the first data and other data associated with a set of addresses relative to the address for the first data.

In some embodiments, the set of addresses is located at a first location and the address for the first data is located at a second location. The first location is subsequent to the second location. In some embodiments, the set of addresses includes a set of addresses in sequential order after the address for the first data.

Figure 5:
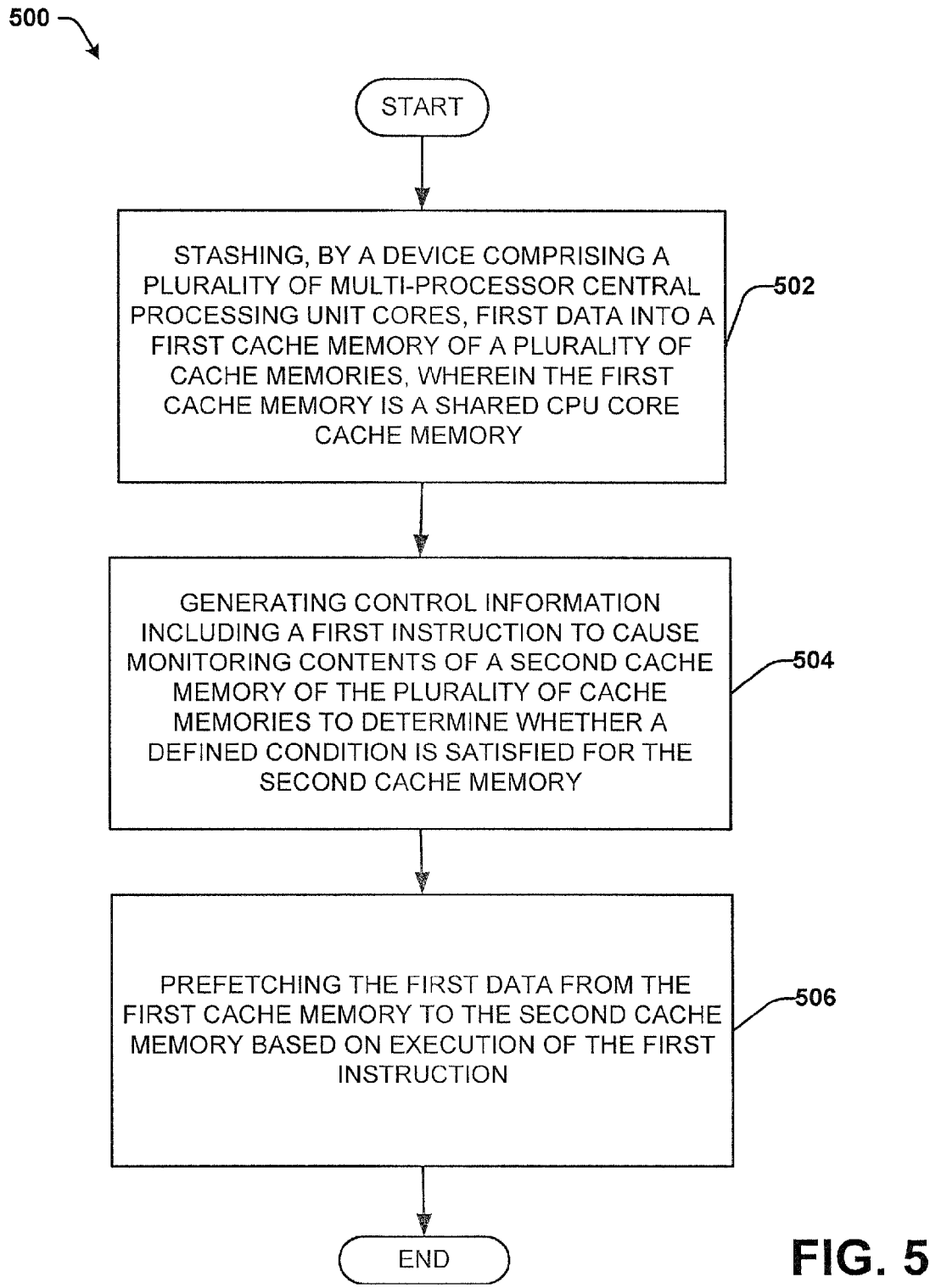

FIG. 5 illustrates a flow diagram of an example, non-limiting embodiment of a method facilitating stashing in multi-level cache memory architectures in accordance with an aspect described herein. At 502, method 500 can include stashing, by a device including a plurality of multi-processor central processing unit cores, first data into a first cache memory of a plurality of cache memories, wherein the first cache memory is a shared CPU core cache memory.

At 504, method 500 can include generating control information including a first instruction to cause monitoring contents of a second cache memory of the plurality of cache memories to determine whether a defined condition is satisfied for the second cache memory.

At 506, method 500 can include prefetching the first data from the first cache memory to the second cache memory based on execution of the first instruction. In some embodiments, the prefetch/address stashing buffer includes prefetch logic that causes the prefetch/address stashing buffer to prefetch the first data from the first cache memory as a result, or side effect, of the execution of the first instruction. In some embodiments, the stashing and the generating are performed concurrently. The second cache memory can be a per processor cache memory and the first cache can be a per processor cache memory.

Figure 6:
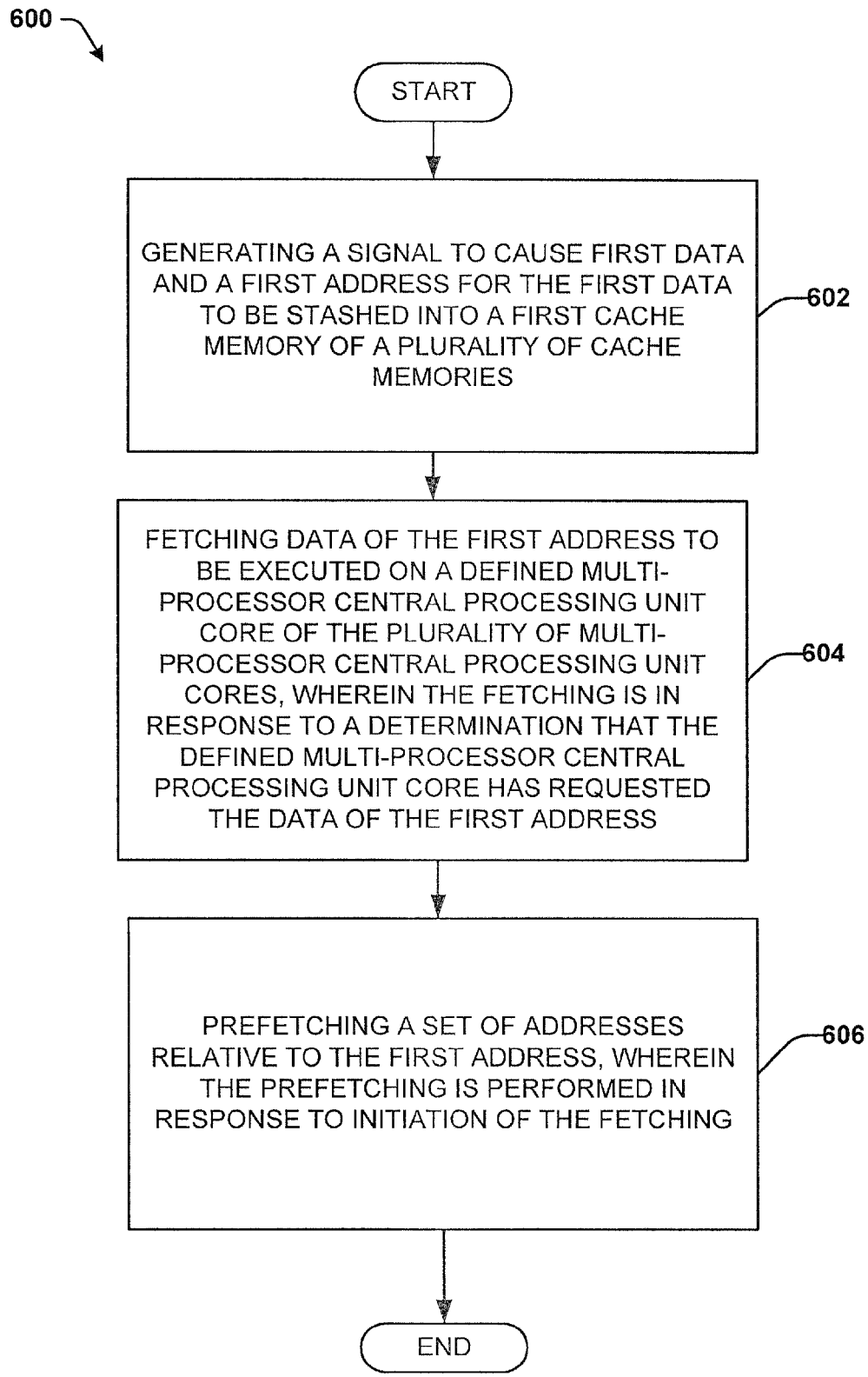

FIG. 6 illustrates a flow diagram of an example, non-limiting embodiment of a method facilitating stashing in multi-level cache memory architectures in accordance with an aspect described herein. At 602, method 600 can include generating a signal to cause first data and a first address for the first data to be stashed into a first cache memory of a plurality of cache memories.

At 604, method 600 can include fetching data at the first address to be executed on a particular defined multi-processor central processing unit core of the plurality of multi-processor central processing unit cores, wherein the fetching is in response to a determination that the defined multi-processor central processing unit core has requested the data at the first address. The first data can include an instruction to be executed on the defined multi-processor central processing unit core.

At 606, method 400 can include prefetching a set of addresses located subsequent to the first address, wherein the prefetching is performed in response to initiation of the fetching. In some embodiments, the set of addresses include instructions to be executed on the defined multi-processor central processing unit core.

In some embodiments, the fetching and prefetching are performed concurrently. In some embodiments, the fetching and the prefetching are performed based on the determination that the defined multi-processor central processing unit core has requested the first address.

Example Computing Environment

Figure 7:
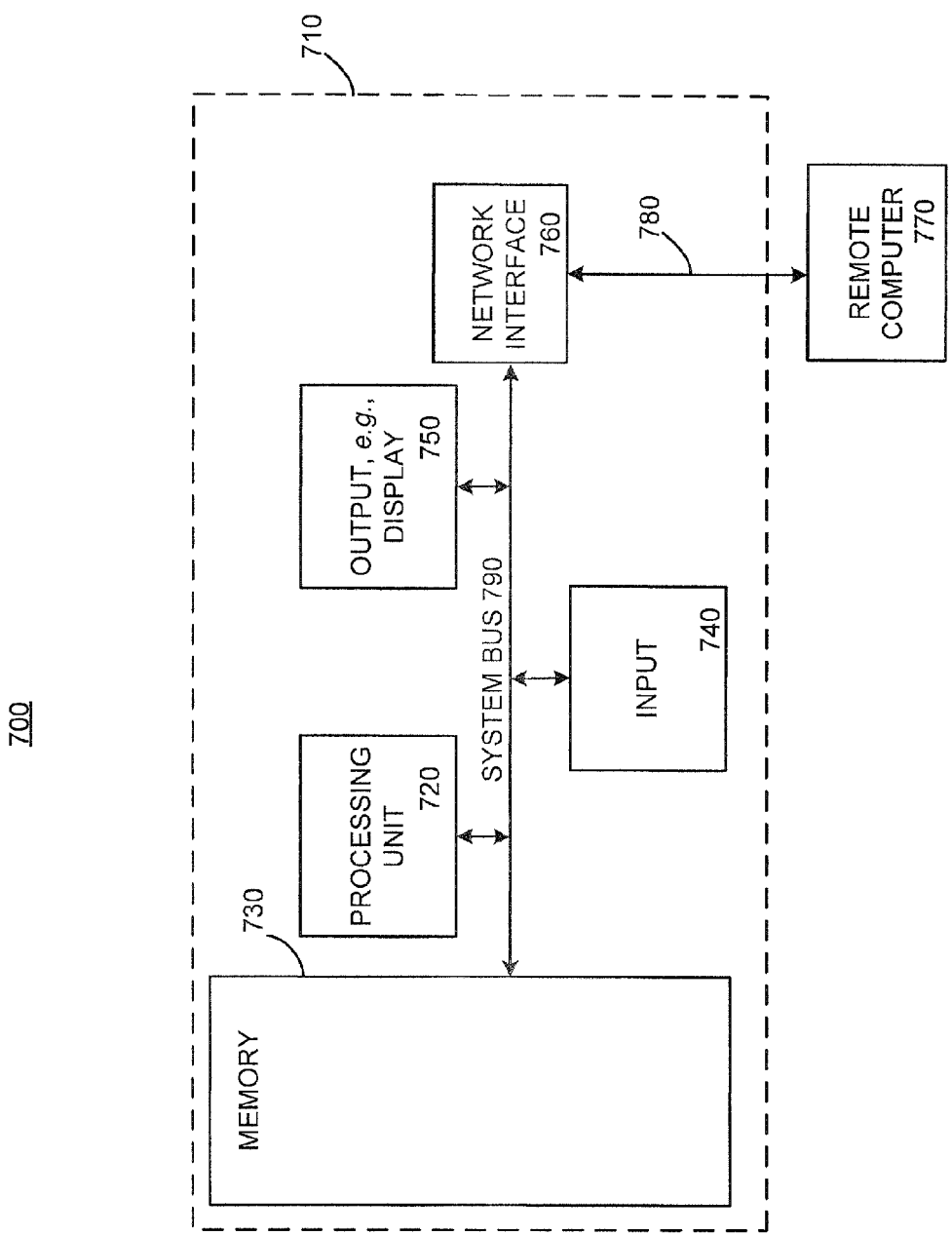
FIG. 7 illustrates a block diagram of an example electronic computing environment that can be implemented to facilitate stashing for in multi-level cache memory architectures in an SoC in accordance with an aspect described herein.

As mentioned, advantageously, the techniques described herein can be applied to any device and/or network in which reduced latency via stashing is desirable in a multi-processor system. It is to be understood, therefore, that handheld, portable and other computing devices and computing objects of all kinds are contemplated for use in connection with the various non-limiting embodiments. Accordingly, the computer/device described below in FIG. 7 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 7 illustrates a block diagram of an example electronic computing environment that can be implemented to facilitate stashing in multi-level cache memory architectures in an SoC in accordance with an aspect described herein. FIG. 7 therefore illustrates an example of a suitable computing system environment 700 in which some aspects of the disclosed subject matter can be implemented, although as made clear above, the computing system environment 700 is only one example of a suitable computing environment for a device and is not intended to suggest any limitation as to the scope of use or functionality of the disclosed subject matter. Neither should the computing environment 700 be interpreted as having any dependency or requirement relating to any one or combination of components illustrated in the exemplary operating environment 700.

With reference to FIG. 7, an exemplary device for implementing the disclosed subject matter includes a computing device in the form of a computer 710. Components of computer 710 may include, but are not limited to, a processing unit 720, a memory 730, and a system bus 790 that couples various system components including the system memory 730 to the processing unit 720. The system bus 790 may be any of several types of bus structures including a memory bus or memory controller, a peripheral bus, and a local bus using any of a variety of bus architectures.

Computer 710 typically includes a variety of computer readable media. Computer readable media can be any available media that can be accessed by computer 710. In some embodiments, the computer readable media can be non-transitory computer readable storage media. Additionally, by way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, compact disk read only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules, or other data in a modulated data signal such as a carrier wave or other transport mechanism and includes any information delivery media.

The memory 730 may include computer storage media in the form of volatile and/or nonvolatile memory such as ROM and/or RAM. A basic input/output system (BIOS), containing the basic routines that help to transfer information between elements within computer 710, such as during start-up, may be stored in memory 730. Memory 730 typically also contains data and/or program modules that are immediately accessible to and/or presently being operated on by processing unit 720. By way of example, and not limitation, memory 730 may also include an operating system, application programs, other program modules, and program data.

The computer 710 may also include other removable/non-removable, volatile/nonvolatile computer storage media. For example, computer 710 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 790 through a non-removable memory interface such as an interface, and a magnetic disk drive or optical disk drive is typically connected to the system bus 790 by a removable memory interface, such as an interface.

A user can enter commands and information into the computer 710 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 720 through user input 740 and associated interface(s) that are coupled to the system bus 790, but may be connected by other interface and bus structures, such as a parallel port, game port, or a universal serial bus (USB). A graphics subsystem can also be connected to the system bus 790. A projection unit in a projection display device, or a heads up display (HUD) in a viewing device or other type of display device can also be connected to the system bus 790 via an interface, such as output interface 750, which may in turn communicate with video memory. In addition to a monitor, computers can also include other peripheral output devices such as speakers which can be connected through output interface 750.

The computer 710 can operate in a networked or distributed environment using logical connections to one or more other remote computer(s), such as remote computer 770, which can in turn have media capabilities different from device 710. The remote computer 770 can be a personal computer, a server, a router, a network personal computer (PC), a peer device, personal digital assistant (PDA), cell phone, handheld computing device, a projection display device, a viewing device, or other common network node, or any other remote media consumption or transmission device, and may include any or all of the elements described above relative to the computer 710. The logical connections depicted in FIG. 7 include a network 780, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 710 can be connected to the LAN 780 through a network interface 760 or adapter. When used in a WAN networking environment, the computer 710 can typically include a communications component, such as a modem, or other means for establishing communications over the WAN, such as the Internet. A communications component, such as wireless communications component, a modem and so on, which can be internal or external, can be connected to the system bus 790 via the user input interface of input 740, or other appropriate mechanism. In a networked environment, program modules depicted relative to the computer 710, or portions thereof, can be stored in a remote memory storage device. It will be appreciated that the network connections shown and described are exemplary and other means of establishing a communications link between the computers can be used.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A method, comprising:
    stashing, by a device comprising a plurality of multi-processor central processing unit cores, first data into a first cache memory of a plurality of cache memories, the first cache memory being a shared cache memory for a plurality of processors and the plurality of cache memories being associated with a multi-level cache memory architecture;
    stashing second data, representative of an address to the first data in the first cache memory, in a second cache memory of the plurality of cache memories, the second cache memory being associated with a processor of the plurality of processors;
    generating control information comprising a first instruction to cause monitoring contents of the second cache memory of the plurality of cache memories to determine whether a defined condition is satisfied for the second cache memory; and
    prefetching the first data from the first cache memory to the second cache memory based on execution of the first instruction.

2. The method of claim 1, wherein the prefetching and the generating are performed concurrently.

3. The method of claim 1, wherein the defined condition comprises the second cache memory failing to store the first data associated with the address.

4. The method of claim 1, wherein the first cache memory is a shared cache memory for two or more of the plurality of multi-processor CPU cores.

5. The method of claim 1, wherein the first cache memory is an L2 shared cache memory and the second cache memory is an L1 per processor cache memory.

6. The method of claim 1, wherein a defined address associated with the first data is also stashed into the first cache memory and the second cache memory.

7. A method, comprising:
    stashing, by a device comprising a plurality of multi-processor central processing unit cores, first data into a first cache memory of a plurality of cache memories, the first cache memory being a shared cache memory for a plurality of processors and the plurality of cache memories being associated with a multi-level cache memory architecture;
    stashing second data comprising a first address to the first data in a second cache memory of the plurality of processors, wherein the second cache memory is part of a per processor memory cache associated with a processor of the plurality of processors;
    determining that the first data will be executed on the processor of the plurality of processors, the determining being based on a detected request for a cache line associated with the second data; and
    generating control information comprising a first instruction to cause prefetching the first data at the first address into the second cache memory of the plurality of cache memories.

8. The method of claim 7, further comprising: detecting the request for the first address.

9. The method of claim 7, wherein the generating is performed in response to the determining.

10. The method of claim 7, wherein the first instruction also causes prefetching second data into the second cache memory, wherein the second data is associated with a set of addresses relative to the first address.

11. The method of claim 10, wherein the set of addresses is located at a first location and the first address is located at a second location, wherein the first location is subsequent to the second location.

12. The method of claim 10, wherein the set of addresses is located at a first location and the first address is located at a second location, wherein the first location is subsequent to the second location in sequential order.

13. A system on chip, comprising:
    a plurality of cache memories communicatively coupled to a plurality of multi-processor central processing unit cores, the plurality of cache memories being associated with a multi-level cache memory architecture and comprising a first cache memory that is a shared memory accessible by the plurality of multiprocessor central processing unit cores, and a second cache memory accessible by a single processor core of the plurality of multiprocessor central processing unit cores;
    a cache memory control circuit configured to generate a signal to cause first data and a first address for the first data to be stashed into the first cache memory of a plurality of cache memories and the first address for the first data to be stashed into the second cache memory; and
    a device configured to perform operations comprising:
        fetching data for the first address associated with the first data to be executed on the single processor core, the fetching being in response to a determination that the single processor core has requested the first address in the second cache memory; and prefetching a set of addresses relative to the first address, the prefetching being performed in response to initiation of the fetching.

14. The system on chip of claim 13, wherein the fetching and the prefetching are performed concurrently.

15. The system on chip of claim 13, wherein the set of addresses comprise instructions to be executed on the defined multi-processor central processing unit core.

16. The system on chip of claim 13, wherein the second cache memory is a per processor cache memory for one of the plurality of multi-processor cache memories.

17. The method of claim 1, wherein the defined condition is the processor accessing a cache line associated with the address.

18. The method of claim 1, wherein the first cache memory is an L3 shared cache memory and the second cache memory is an L2 per processor cache memory.

19. The system on a chip of claim 13, wherein the single processor core accesses a cache line associated with the first address in the second cache memory.

\* \* \* \* \*